United States Patent
Telakowski

(10) Patent No.: US 7,644,792 B2
(45) Date of Patent: Jan. 12, 2010

(54) MOTOR COOLING SYSTEM

(75) Inventor: Robert Telakowski, Windsor Locks, CT (US)

(73) Assignee: Hamilton Sundstrand, Windsor Locks, CT (US)

( * ) Notice: Subject to any disclaimer, the term of this patent is extended or adjusted under 35 U.S.C. 154(b) by 344 days.

(21) Appl. No.: 11/327,113

(22) Filed: Jan. 6, 2006

(65) Prior Publication Data

US 2007/0158122 A1    Jul. 12, 2007

(51) Int. Cl.
*B60K 11/00* (2006.01)
*B60K 13/00* (2006.01)
(52) U.S. Cl. ..................... 180/68.1; 180/68.2
(58) Field of Classification Search ........... 180/68.1, 180/68.2
See application file for complete search history.

(56) References Cited

U.S. PATENT DOCUMENTS

| | | | | |
|---|---|---|---|---|
| 4,858,565 A | * | 8/1989 | King | 123/41.31 |
| 5,483,807 A | * | 1/1996 | Abersfelder et al. | 62/435 |
| 6,467,538 B1 | * | 10/2002 | Acre et al. | 165/266 |
| 6,854,544 B2 | * | 2/2005 | Vide | 180/68.6 |
| 7,296,645 B1 | * | 11/2007 | Kerner et al. | 180/68.1 |
| 2002/0043413 A1 | * | 4/2002 | Kimishima et al. | 180/68.1 |
| 2005/0056472 A1 | * | 3/2005 | Smith et al. | 180/68.1 |
| 2006/0102399 A1 | * | 5/2006 | Guilfoyle et al. | 180/68.1 |

* cited by examiner

*Primary Examiner*—Paul N Dickson
*Assistant Examiner*—John R Olszewski
(74) *Attorney, Agent, or Firm*—Carlson, Gaskey & Olds P.C.

(57) ABSTRACT

A vehicle motor system includes a motor that receives cooling fluid flow from two different cooling sources. A control, such as a valve, selectively changes the cooling flow between the two cooling sources in response to an operational state of the vehicle.

15 Claims, 1 Drawing Sheet

MOTOR COOLING SYSTEM

BACKGROUND OF THE INVENTION

This invention relates to motor cooling systems, and more particularly, to an electric motor that utilizes two different cooling air sources depending upon a state of the host vehicle.

Vehicles, such as aircraft, typically include rotating machinery to move fluids throughout various vehicle systems to operate the vehicle. The rotating machinery, such as a fan or a compressor, is typically driven by an electric motor. During operation, the electric motor requires cooling to maintain desirable operating temperatures of the motor. Typically, forced air from movement of the vehicle (i.e. ram air) is used to cool the motor. Alternatively, dedicated cooling equipment, such as a blower fan driven by an additional motor, is used to provide motor cooling.

Ram air cooling is effective when the vehicle is in motion, however, when the aircraft is on the ground or moving at a relatively slow speed, the ram air may not provide the desired amount of cooling. Dedicated cooling equipment may offer improved cooling air flow at low vehicle speeds, however, dedicated cooling equipment may undesirably reduce system reliability, increase weight, and add expense.

Accordingly, there is a need for a compact and inexpensive motor cooling system that maintains a motor at a desired operating temperature during various travel states of the vehicle.

SUMMARY OF THE INVENTION

A vehicle motor system according to the present invention includes a motor that receives cooling air from a ram air cooling source or from another source within the vehicle. A control selectively changes the cooling fluid flow between the ram air cooling source and air from a secondary source within the vehicle in response to a vehicle operating state.

In one example, the control selectively allows cooling air flow from a vehicle compartment when the vehicle is traveling at a relatively low speed and allows cooling fluid flow from the ram air cooling source when the vehicle is traveling at a relatively high speed. In other examples, the control selectively operates to change the fluid flow between the ram air cooling source and air from the vehicle compartment in response to a weight on a wheel of the vehicle or an altitude of the vehicle.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
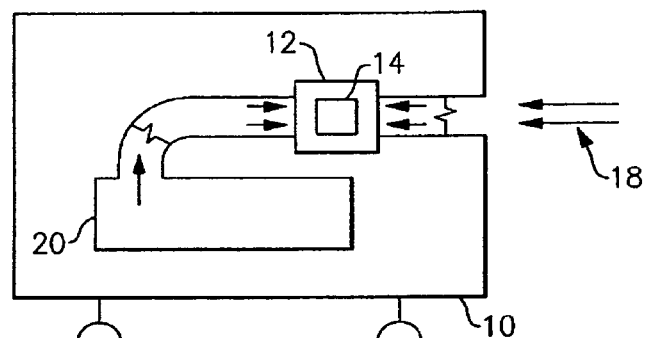
FIG. 1 schematically shows an example vehicle having an air processing assembly.

FIG. 1 schematically shows selected portions of a vehicle 10 having an air processing assembly 12, such as an inerting air system that removes oxygen from air to produce nitrogen-enriched air for use in vehicle fuel tanks (not shown). In this example, the air processing assembly 12 includes a motor 14 to move the air throughout the air processing assembly 12 and vehicle 10.

During operation, the motor 14 produces undesirable heat that is removed by the air that is pumped through the air processing assembly 12 to limit the motor 14 to a desirable operating temperature. The air processing assembly 12 is fluidly connected with ram air 18 and air from a secondary source 20, such as a cargo hull, within the vehicle. The air processing assembly 12 selectively receives cooling air from the ram air 18 and the secondary source 20 to maintain acceptable operating temperatures within the motor.

Figure 2:
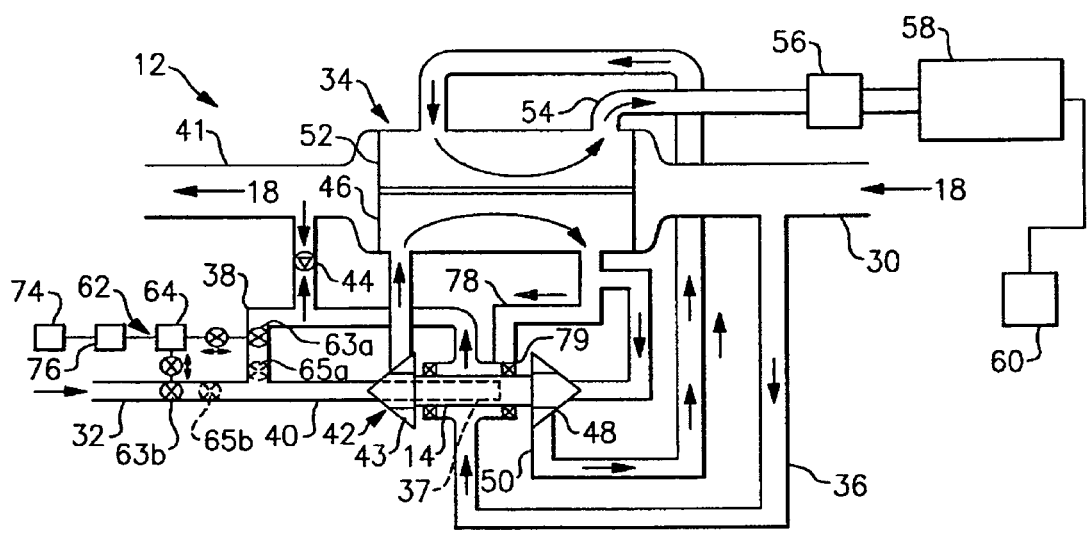
FIG. 2 is a more detailed view of the air processing assembly shown in FIG. 1.

Referring to FIG. 2, the air processing assembly 12 includes a first inlet 30 in communication with the ram air 18 and a second inlet 32 in communication with the secondary source 20. The first inlet 30 is fluidly connected to a heat exchanger 34 and a ram air conduit 36. At least a portion of the outer surface of the motor 14 is exposed inside the ram air conduit 36 to provide cooling of the motor 14. Alternatively, the motor 14 includes an internal cooling passage 37 in fluid communication with the ram air conduit 36 for cooling the motor 14.

The ram air conduit 36 continues past the motor 14 and fluidly connects to conduits 38 and 40 that lead to a first compressor 42 having an impeller 43 that is driven by the motor 14. A check valve 44 between the conduit 38 and a duct 41 (after flow through the heat exchanger 34) prevents ram air 18 flow into the conduit 38 and allows flow from the conduit 38 to the duct 41.

The first compressor 42 is fluidly connected to the internal cooling passage 37 of the motor 14 and to a first portion 46 of the heat exchanger 34, which is fluidly connected to a second compressor 48. The first compressor 42 and the second compressor 48 are both driven by the motor 14. The second compressor 48 includes an output 50 leading to a second portion 52 of the heat exchanger 34. In the illustrated example, the heat exchanger 34 includes an output 54 leading to a filter 56, air separation module 58, and processing assembly 60 for oxygen and water removal for example.

A dual valve 62 is located near the connection between the ram air conduit 36 and the second inlet 32. The dual valve 62 includes mechanically coupled valve members 63a and 63b such that opening of one necessarily closes the other. An actuator 64 selectively drives the dual valve 62. Alternatively, the dual valve 62 is replaced by two separate valves 65a and 65b that cooperate to control the cooling air flow. As an alternative, the dual valve can be replaced by a three way valve to effectively accomplish the same objective.

During operation of the air processing assembly 12, the dual valve 62 selectively actuates in response to a state of the vehicle 10 to allow the motor 14 to be cooled by the ram air 18 or by air from the secondary source 20 when there is little or no ram air 18 flow, for example.

The dual valve 62 is in electrical communication with a vehicle sensor 74. The vehicle sensor 74 detects, for example, vehicle altitude, vehicle speed, a weight on a vehicle wheel 77 (shown schematically in FIG. 1), or any combination of these vehicle states, and signals the dual valve 62. In response to one or more of the vehicle states, the actuator 64 opens valve member 63a and closes valve member 63b (i.e., allows flow from the second inlet 32 to the conduit 40 and prevents flow from the conduit 38 to the conduit 40). For example, the actuator 64 may open valve member 63a and close valve member 63b when the vehicle 10 is on the ground and moving at a relatively low speed, or if there is predetermined amount of weight on the wheel 77. A low speed or a weight on the wheel 77 may indicate that little or no cooling air is available through the ram air conduit 36. This allows the first compressor 42 to draw air in through the conduits 38 and 40 from the secondary source 20 to cool the motor 14 and maintain a desirable motor 14 operating temperature.

The actuator 64 closes valve member 63a and opens valve member 63b when the vehicle 10 is airborne, moving at a relatively high speed, when there is no weight on the wheel 77, or any combination of these vehicle states. This allows flow from the second inlet 32 to the conduit 40 and prevents flow from the conduit 38 to the conduit 40. This provides motor 14 cooling by allowing ram air 18 to flow from conduit 30 to conduit 36 and into the internal cooling passage 37 of motor 14 into conduit 38 past check valve 44 and return to duct 41.

Optionally, a controller 76 is used with the vehicle sensor 74 to process signals from the vehicle sensor 74 and send commands to the actuator 64. The controller 76 may be a computer with a processor and memory storing a computer program, which when executed by the processor controls the valve 62 based upon signals from the sensor 74 in the manner described herein.

The dual valve 62 provides the benefit of failsafe operation by ensuring that ram air 18 or air from the secondary source 20 continually provides motor 14 cooling. That is, the dual valve 62 functions to allow flow from the ram air 18, the secondary source 20, or both during transition of the dual valve 62 between open and closed positions of 63a and 63b. Alternatively, the dual valve 62 is replaced by the two separate valves 65a and 65b to control the cooling air flow as described herein.

In selective situations, it may be desirable to establish the dual valve positions at intermediate interim positions to adjust the amount of flow taken from each circuit to optimize operation.

In the illustrated example, it is desirable to provide air to the air separation module 58 and processing assembly 60 at a selected pressure and temperature. A portion of the ram air 18 or the air from the secondary source 20 that is received by the first compressor 42 becomes heated during the compression process. The heated air is sent to the first portion 46 of the heat exchanger 34 to be cooled. The heat from the motor 14 that is added to the air before compression in the first compressor 42 has a minimal impact on the operation of the air processing system 12. The air is cooled in the first portion 46 and travels to the second compressor 48. A portion of the cooled air is diverted through conduit 78 for cooling bearings 79 of the motor 14. The second compressor 48 compresses the air and transmits the compressed air through the output 50 to the second portion 52 of the heat exchanger 34. The second portion 52 further cools the air before it is transferred to the filter 56 and the air separation module 58 at a desired pressure and temperature for further air processing, such as oxygen and moisture removal.

The air processing assembly 12 provides the benefit of enabling motor 14 cooling by different cooling sources (ram air 18 or air from the vehicle secondary source 20 such as compartment) in response to different vehicle 10 states. For example, when the vehicle 10 is not moving and ram air 18 is not readily available, a desirable motor 14 temperature can be maintained by drawing cooling air from the secondary source 20. It is to be understood that the secondary source 20 is just one example source of cooling air in addition to ram air 18 and that other sources may be used. Furthermore, the air processing assembly 12 avoids using dedicated and relatively heavy additional equipment to cool the motor 14, which is a drawback of the prior art.

Although a preferred embodiment of this invention has been disclosed, a worker of ordinary skill in this art would recognize that certain modifications would come within the scope of this invention. For that reason, the following claims should be studied to determine the true scope and content of this invention.

I claim:

1. A vehicle motor system comprising:
 a motor having a cooling passage for receiving cooling fluid flow from at least one of a first cooling source and a second cooling source that is different than the first cooling source; and
 a control that is selectively operative to change the cooling fluid flow between said first and second cooling sources, wherein said first cooling source includes ram air and said second cooling source includes air from a vehicle compartment.

2. The system as recited in claim 1, wherein said control is selectively operative in response to a vehicle operational state.

3. The system as recited in claim 2, wherein said vehicle operational state includes a vehicle altitude.

4. The system as recited in claim 2, wherein said vehicle operational state includes a vehicle speed.

5. The system as recited in claim 2, wherein said vehicle operational state includes an amount of weight on at least one wheel of the vehicle.

6. The system as recited in claim 1, wherein said control includes first and second valves that are operative, respectively, to control said cooling fluid flow from said first and second cooling sources.

7. The system as recited in claim 2, wherein ram air utilizes dynamic air pressure created by motion of the vehicle to increase air flow into an intake.

8. A vehicle motor system comprising:
 a motor having a cooling passage for receiving cooling fluid flow from at least one of a first cooling source and a second cooling source that is different than the first cooling source; and
 a control that is selectively operative to change the cooling fluid flow between said first and second cooling sources, wherein said control includes a dual valve that is moveable between first and second positions that correspond, respectively, to said first and second cooling sources.

9. A vehicle motor system comprising:
 a motor;
 an impeller driven by said motor to draw cooling air through said motor from at least one of a ram air cooling source and a vehicle compartment cooling source; and
 at least one valve in fluid communication with said impeller and moveable between a first and second positions that correspond, respectively, to said ram air cooling source and said vehicle compartment cooling source.

10. The system as recited in claim 9, wherein said motor includes a downstream compressor in fluid communication with said impeller.

11. The system as recited in claim 10, including a first heat exchanger portion in fluid communication between said impeller and said compressor.

12. The system as recited in claim 11, including a second heat exchanger portion in fluid communication with and downstream from said compressor.

13. The system as recited in claim 12, including an air separation module downstream from said second heat exchanger portion.

14. The system as recited in claim 9, including a vehicle state sensor in electrical communication with said at least one valve.

15. The system as recited in claim 14, including a controller that commands said valve to move between said first and second positions in response to signals from said vehicle state sensor.

* * * * *

UNITED STATES PATENT AND TRADEMARK OFFICE
CERTIFICATE OF CORRECTION

PATENT NO. : 7,644,792 B2  Page 1 of 1
APPLICATION NO. : 11/327113
DATED : January 12, 2010
INVENTOR(S) : Robert Telakowski It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 489 days.

Signed and Sealed this

Twenty-first Day of December, 2010

David J. Kappos
*Director of the United States Patent and Trademark Office*